INVENTORS
A. ASHKIN
G. D. BOYD
D. A. KLEINMAN

ATTORNEY

United States Patent Office 3,387,204
Patented June 4, 1968

3,387,204
HARMONIC GENERATION AND OTHER PARA-
METRIC DEVICES WITH NONLINEAR INTERAC-
TION OF SHORT ELECTROMAGNETIC WAVES
OVER EXTENDED COHERENCE VOLUMES
Arthur Ashkin, Bernardsville, Gary D. Boyd, Murray Hill, and David A. Kleinman, Plainfield, N.J., assignors to Bell Telephone Laboratories, Incorporated, New York, N.Y., a corporation of New York
Filed Aug. 31, 1964, Ser. No. 393,029
9 Claims. (Cl. 321—69)

This invention relates to nonlinear interactions within suitable birefringent materials. It has particular application to optical harmonic generation as well as to parametric amplification and oscillations.

The harmonic generation of coherent light was disclosed in an article by P. A. Franken et al. in volume 7 of Physical Review Letters at page 118 (1961). Such generation involved focusing coherent red light supplied from an optical maser upon a quartz crystal for inducing the emission of ultraviolet light. The generation process in such an arrangement was inefficient due to the difference in phase velocities of the applied light and the induced light, which produces destructive interference of the induced signal when the induction occurs over an extended region. Stated differently, the coherence length within the material over which cumulative phase addition occurred was small. It was necessary to use focused beams to increase the energy density in the tiny coherence region immediately surrounding the focal point.

Subsequently, J. A. Giordmaine pointed out in his article, "Mixing of Light Beams in Crystals," in volume 8 of Physical Review Letters (1962) at page 19 that the coherence length could be significantly increased by phase matching through an appropriate choice of the nonlinear element and by an appropriate choice of the direction of application of the signal light. The particular direction specified was that for which the phase velocity of the applied fundamental frequency energy and the phase velocity of the generated harmonic energy were substantially equal. In this manner the destructive interference of the prior art was eliminated over significantly increased propagation distances.

The present availability of single mode gas lasers has made possible the use of phase matching in crystals of increasing length. It has recently been pointed out that the generation of second harmonic energy in the described phase-matched condition will be limited by the slightly different directions of propagation of the applied fundamental energy and the generated harmonic energy. This effect, termed the aperture effect in the literature, can be characterized by a length $l_a$ which represents the crystal thickness for which a second harmonic beam beginning at the incident surface with the same aperture as the generating laser beam completes separation from the laser beam. It has heretofore been believed that, regardless of the parallelism of the laser beam, the effective coherence length could never be greater than the aperture length $l_a$.

It is the object of the present invention to increase the effective coherence length of a nonlinear optical harmonic generation arrangement.

It is a more specific object of the invention to generate in a nonlinear crystal second harmonic wave energy traveling parallel to the resultant fundamental beam power flow within the crystal while maintaining the matched phase velocity condition between fundamental and harmonic energy.

In accordance with the invention, two fundamental wave energy beams or beam portions are spatially mixed within a nonlinear crystal in directions simultaneously producing phase matching and a net fundamental energy flow which is both normal to the optic axis of the material and parallel to the generated harmonic energy. Since the resultant fundamental and the generated harmonic are propagating in the same direction along parallel paths, the aperture length based on prior art coherence length consideration is theoretically infinite. Actually, diffraction within the crystal itself imposes an ultimate finite limit.

In general, for the practice of the invention the material chosen as the nonlinear crystal should not have a center of symmetry; it should have a suitably large nonlinear polarizability; it should be sufficiently birefringent with respect to its dispersion at the frequencies of interest; it should have low absorption at the frequencies of interest; and advantageously, it should be relatively convenient to make.

According to a first specific embodiment of the invention, first and second fundamental frequency beams are incident upon an elongated plane parallel dielectric crystal slab and are iteratively totally internally reflected from the surfaces thereof to travel along its length. The generated harmonic energy travels parallel to the resultant fundamental energy in the material and each time the fundamental beams cross an additional active coherence volume is produced.

In accordance with additional embodiments of the invention a single fundamental beam is applied to a suitable birefringent crystal which is adapted effectively to split the beam into two portions which effect phase matching and whose resultant power flow is normal to the optic axis of the crystal and parallel to the generated harmonic energy.

Features of the invention include nonlinear crystals having particularly configured input surfaces, nonlinear crystals in combination with prism input members, and multiple cavity arrangements in combination with the nonlinear crystal embodiments. The principles of the invention are also useful in parametric amplifiers and parametric oscillators.

The above and other objects and features of the invention, together with its attendant advantages, will become more apparent upon reference to the accompanying drawing and to the detailed description thereof which follows.

Figure 1:
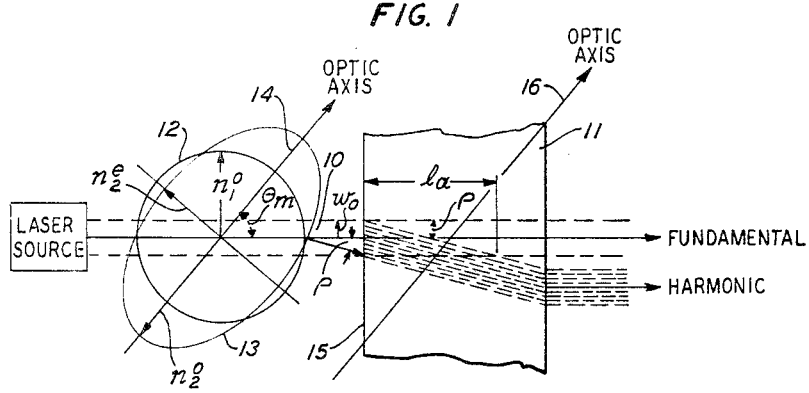
FIG. 1 is a representational drawing of an harmonic generator with phase matching in accordance with the prior art.

Referring now to the drawing in detail, FIG. 1 is a schematic representation of an optical maser beam 10 of width $2w_0$ interacting with a negative uniaxial crystal 11 of a suitable birefringent material such as potassium dihydrogen phosphate (KDP). The orientation of beam and crystal is in accordance with the phase-matched condition of the prior art as set out in the Giordmaine publication referred to hereinabove. The principles of phase matching can best be understood from reference to the two-dimensional polar coordinate plot in FIG. 1 of the indices of refraction for the ordinary fundamental wave energy and the extraordinary harmonic wave energy, as a function of propagation direction. Since the refractive index and therefor the phase velocity for the fundamental ordinary wave is independent of the propagation direction, the index surface, represented by circle 12, is a sphere of radius $n_1^o$. The refractive index for the extraordinary harmonic wave however depends upon the propagation direction and the index surface is thus represented by ellipse 13, which is a cross section of an ellipsoid of revolution about the optic axis 14 of crystal 11. The ellipsoid is characterized by a major half axis $n_2^o$ and a minor half axis $n_2^e$. The ellipsoid and the sphere intersect at locations which are displaced from the optic axis an angle $\theta_m$, the matching angle. Thus in FIG. 1 crystal 11 is oriented such that its optic axis 16 and the normal to surface 15 are related by $\theta_m$. For a KDP crystal, and for incident red light, the matching angle is approximately 50 degrees.

The phase matching condition implies that the phase velocities of the fundamental and the harmonic waves are equal in magnitude and direction. However, since the direction of power flow in a birefringent crystal is defined by the normal to the index surface for the wave being considered, it can be seen that the harmonic power flow is related to fundamental power flow by an angle $\rho$ given by $$\tan \rho = \frac{1}{2}(n_1^o)^2 \left\{ \frac{1}{(n_2^e)^2} - \frac{1}{(n_1^o)^2} \right\} \sin 2\theta_m \quad (1)$$

As a result of the finite angle $\rho$, the harmonic power generated at any point within the crystal along the fundamental beam diverges from the initial propagation direction and eventually separates from the fundamental beam in a distance $l_a$ which is termed the maximum interaction length, or effective aperture. Geometrically, $$\frac{l_a}{2w_0} \cong \frac{1}{\rho} \quad (2)$$

where $w_0$ is the beam radius to the $1/e$ point of the electric field distribution of the fundamental beam mode. For KDP at the matching angle $1/\rho \cong 33$. Thus, after approximately 33 beam diameters, the fundamental and harmonic powers separate and no further interaction occurs. From Equation (2), if $\rho=0$, no separation occurs and the interaction length becomes infinite. Actually, beam diffraction limits the interaction to a length $l_d$ which, while much greater than $l_a$ is finite.

In accordance with the invention, therefore, the angle $\rho$ is made equal to zero by applying fundamental wave energy in a plurality of effective beam portions having a resultant energy vector normal both to the index surface of the fundamental as well as to the index surface of the harmonic energy.

It is now well known that traveling wave nonlinear interaction occurs in a suitable birefringent crystal so long as the various frequencies $\omega$ and propagation constants $\beta$ satisfy the Tien vectorial $\omega-\beta$ conditions:

$$\omega_1 + \omega_2 = \omega_3 \quad (3)$$

and $$\beta_1 + \beta_2 = \overline{\beta}_3 \quad (4)$$

For second harmonic generation in optically nonlinear materials, let $\omega_1 = \omega_2 = \omega_f$, the fundamental frequency; and $\omega_3 = \omega_h$, the harmonic frequency. Then (3) and (4) become $$2\omega_f = \omega_h \quad (5)$$

and $$\overline{\beta}_f + \overline{\beta}_f' = \overline{\beta}_h \quad (6)$$

Equation (6) thus illustrates that the fundamental power can be split into two beams with propagation vectors $\overline{\beta}_f$ and $\overline{\beta}_f'$, not in the same direction, which can add to produce phase matching in the direction $\overline{\beta}_h$. The harmonic power emerges in the direction $\overline{\beta}_h$, which is different from the direction of $\overline{\beta}_f$ and $\overline{\beta}_f'$.

Figure 2:
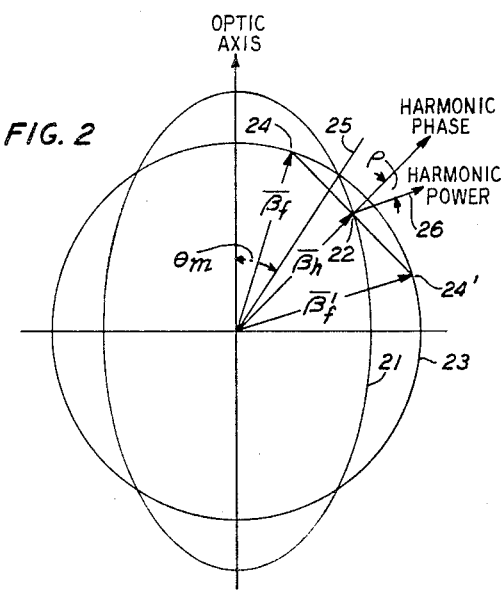
FIG. 2 is an index surface diagram given for purposes of explanation.

Such spatial mixing to produce phase matching is illustrated in the index surface plot of FIG. 2 with specific reference to a negative uniaxial crystal such as KDP. In FIG. 2 a first fundamental beam represented by vector $\overline{\beta}_f$ and a second fundamental beam represented by vector $\overline{\beta}_f'$ add vectorially to produce a $\overline{\beta}_h$ which falls on the elliptical surface 21, thereby effecting phase matching.

Such phase matching was pointed out by Maker et al. in their article entitled, "Effects of Dispersion and Focusing on the Production of Optical Harmonics," which appeared at page 21 of volume 8 of Physical Review Letters (1962). To effect phase matching with two beams at a given point on the harmonic ellipse, such as point 22 in FIG. 2, the chord of spherical fundamental index surface 23 which passes through point 22 is constructed. The directions of the fundamental beams producing phase matching are those for which vectors $\overline{\beta}_f$ and $\overline{\beta}_f'$ terminate at the chord extremities designated as points 24 and 24'. The single fundamental beam matching direction is indicated by arrow 25 for comparison purposes. Although the harmonic phase direction is parallel to $\overline{\beta}_h$, the harmonic power flow is normal to the elliptical surface 21 as indicated by arrow 26. Thus the angle $\rho$ is again finite, indicating that harmonic power slips away from fundamental power within the crystal, thereby imposing a limitation through harmonic beam double refraction over the effective interaction length.

Figure 3:
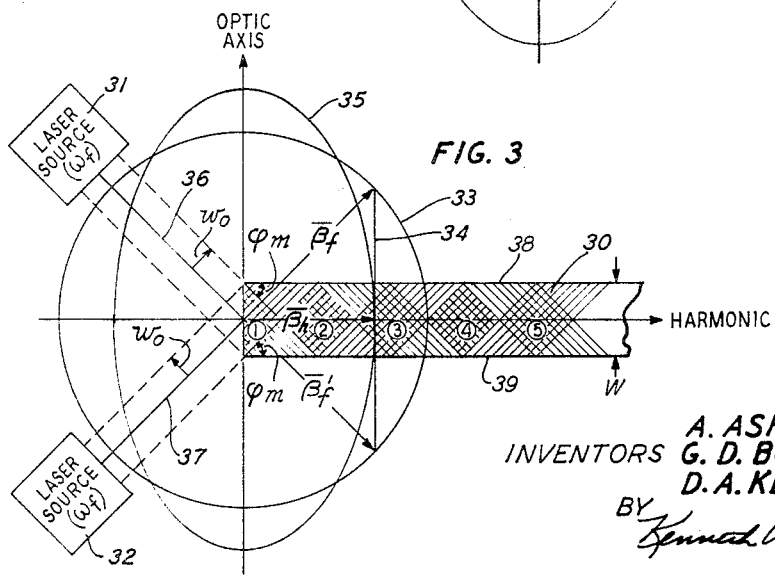
FIG. 3 is a representational drawing of an harmonic generator with phase matching in accordance with the present invention.

Such limitation is eliminated in accordance with the principles of the present invention in the embodiment of FIG. 3. In FIG. 3, dielectric waveguiding slab structure 30 of width W is simultaneously illuminated by beams 36, 37 of equal frequency fundamental energy and of width $2w_0$ from laser sources 31, 32. The distance from each source to crystal 30 is adjusted to effect an equiphase energy front at the input surface.

The direction of the fundamental beams is chosen to produce phase matching with the harmonic power emerging in a direction $\overline{\beta}_h$ which is normal to the optic axis of the waveguiding material. Specifically, the sources are directed along the radii $\overline{\beta}_f$ and $\overline{\beta}_f'$ of the fundamental index surface 33, at an angle $\varphi_m$, terminating on the ends of a chord 34 of surface 33 parallel to the optic axis and tangent to the harmonic elliptical index surface 35.

From FIG. 3 it can be shown that $$n_1^o \cos \varphi_m = n_2^e$$

or $$\varphi_m = \cos^{-1} \frac{n_2^e}{n_1^o}, \quad (7)$$

where $n_1^o$ is the index of refraction of the guide material for the fundamental ordinary ray and $n_2^e$ is its refractive index for the harmonic extraordinary ray. As also seen from FIG. 3, the harmonic power flow is normal to surface 35; and the net resultant fundamental power flow— the resultant of vectors $\overline{\beta}_f$ and $\overline{\beta}_f'$—is normal both to surface 33 and surface 35. Thus $\rho=0$ and there is no double refraction.

If, however, crystal slab 30 is not properly configured, the crossover region for the fundamental beams would be limited to the single triangular region designated ① in FIG. 3. This would not represent a particularly useful solution to the problem of small coherence length since the region of beam overlap is about 5 beam diameters for KDP, for example. Accordingly, a multiple crossover configuration is desirable.

Multiple crossover regions are produced in the crystal 30 by elongating it in a direction parallel to the elongated dielectric waveguiding structure 30 by orienting energy propagation direction and providing a pair of plane parallel surfaces 38, 39. When beams 36, 37 are incident at the matching angle $\varphi_m$ to the parallel slab surfaces, the energy undergoes repeated total internal reflection within the material. Thus the volume of active coherence is iteratively increased. Furthermore, the angle $\varphi_m$, which ensures phase matching in crossover region ①, remains constant throughout and thus the energy remains phase matched in the successive crossover region ② ... ⑤, etc.

Typical slab dimensions for a crystal 30 comprising KDP and illuminated by a beam having a width of $2w_0$ can be derived with the use of Equation (2) and the geometrical relationship $$W \cos \varphi_m = 2w_0$$

from FIG. 3.

For $w_0 \cong 0.1$ cm.

$$W = \frac{0.2}{\cos \varphi_m} \cong 0.201 \text{ cm.}$$

The crystal length should exceed $$l_a = \frac{2w_0}{\rho} = 33 \ (0.2)$$

$$l_a = 6.6 \text{ cm.}$$

in order to realize increased coherence length in accordance with the invention.

In the arrangement of FIG. 3, an additional refinement can increase the realizable coherence length. The desirability for such refinement arises from the fact that the fundamental beams undergo a phase shift upon reflection from the parallel faces 38, 39 of the crystal guide. For a reflection angle of about 10 degrees, which is appropriate to KDP, the phase shift of the fundamental is about 30 degrees. Thus, the harmonic generated in overlap region ① will be somewhat out of phase with the harmonic generated in region ②. This slip in phase is cumulative and will tend to result in destructive interference after several bounces.

By modifying the angle $\varphi_m$ of FIG. 3 a small amount, the precise phase matching condition is disturbed slightly and the fundamental can be made to lag or to lead the harmonic slightly in each interaction region. For example, if the fundamental slips relative to the harmonic upon reflection, $\varphi_m$ is changed enough to make the fundamental lead by the same amount in each overlap region. This results in zero net phase shift between fundamental and harmonic in each complete interaction, defining a complete interaction as an overlap region plus a reflection. For KDP, at any point along the guide the fundamental and harmonic will never be out of phase by more than 30 degrees. This amount of phase mismatch is negligible when not cumulative. To get the desired large output from the harmonic generator many bounces are required, and the phase correcting scheme is therefore quite advantageous.

It is possible to realize the extended coherence lengths of the embodiment of FIG. 3 with a single fundamental frequency beam, rather than with two separate beams. In the single beam embodiments the structures are configured and the energy source is oriented to produce, internally of the birefringent medium, a beam which has two component portions corresponding to the separate beams already discussed.

Figure 4:
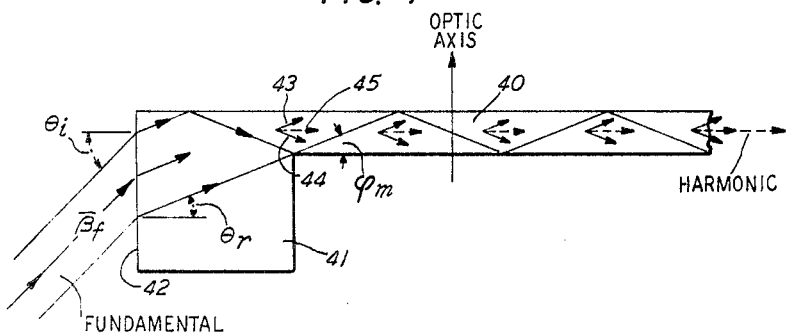
FIGS. 4, 5A, 5B, 6, and 7 are additional embodiments of the invention.

Such an arrangement is depicted in FIG. 4 in which elongated dielectric slab 40 has a thickened portion 41 at its input end. Fundamental frequency energy from a laser source not shown is incident as beam $\bar{\beta}_f$ upon surface 42 at an angle of incidence $\theta_i$. The angle of incidence is determined from Snell's Law of geometrical optics such that the angle of refraction $\theta_r$ is equal to the matching angle $\varphi_m$ in the elongated portion of crystal 40. The dimensions of elongated portion 41 are determined by the beam diameter of the incident energy. In any case, portion 41 has a width for which the lower ray of the incident beam is transmitted into the elongated slab without leaving the solid medium.

The beam $\bar{\beta}_1$, once within the elongated portion of the crystal is trapped by total internal reflection from the parallel sides thereof. The trapped beam can be broken down into two components, represented by arrows 43, 44, for example, which meet all the requirements set out for the separately incident beams of FIG. 3. Thus harmonic energy is generated within the crystal, which is in the phase-matched condition, and propagates normal to the optic axis, as indicated by arrow 45.

Figure 5A:
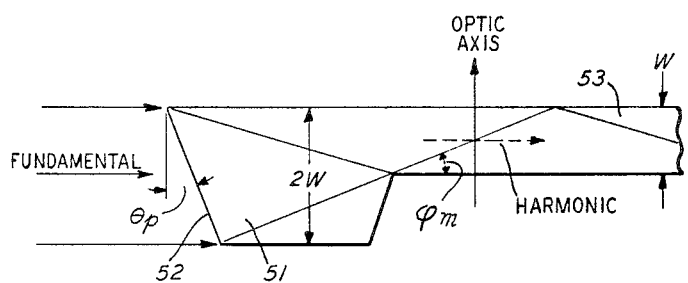
Figure 5B:
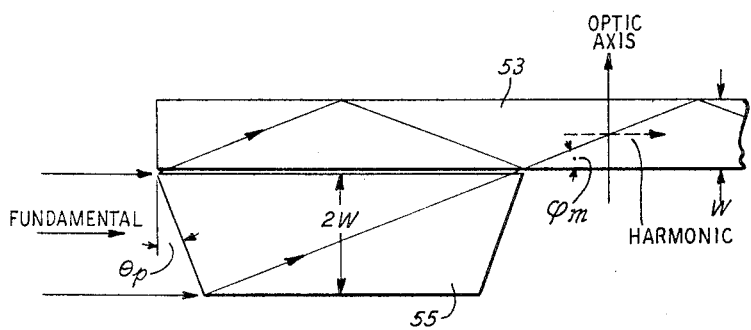
Figure 6:
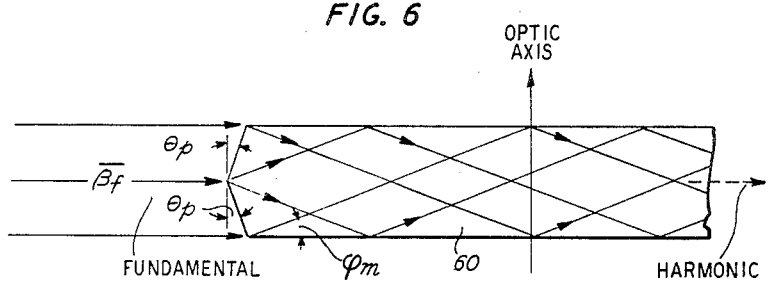

FIGS. 5A, 5B, and 6 are alternative single incident beam embodiments of the invention. In these embodiments the direction of propagation of the fundamental beam is normal to the optic axis of the nonlinear crystal and therefore parallel to the direction of propagation of the generated harmonic energy.

In FIG. 5A thickened input portion 51 of height 2W introduces refractions at angular surface 52 which permit the fundamental input to be parallel to the harmonic power generated in elongated portion 53 of height W. At the same time the phase matching and total internal reflection condition implicit in $\varphi_m$ are satisfied. The angle $\theta_p$ is related to the index of refraction $n_1^o$ of the nonlinear crystal and $\varphi_m$ by the expression $$\tan \theta_p = \frac{n_1^o \sin \varphi_m}{n_1^o \cos \varphi_m - 1} \qquad (8)$$

In FIG. 5B the need for a thickened portion of the nonlinear crystal material is eliminated by the use of a separate matching portion 55 which is optically joined to elongated slab portion 56 through an index matching fluid. The material of matching portion 55 is selected to be optically similar to crystal 53. Other parameters are identical to those of FIG. 5A.

The geometry of FIG. 6 permits fundamental beam incidence normal to the optic axis of crystal 60 without requiring the thickened input portions of FIGS. 4, 5A, and 5B. However, it should be noted that the entire crystal volume is not active in the harmonic generation process in the embodiment of FIG. 6. As in the preceding embodiments, $\theta_p$ and $\varphi_m$ are defined as before and are related by the expression set out in Equation (7).

Figure 7:
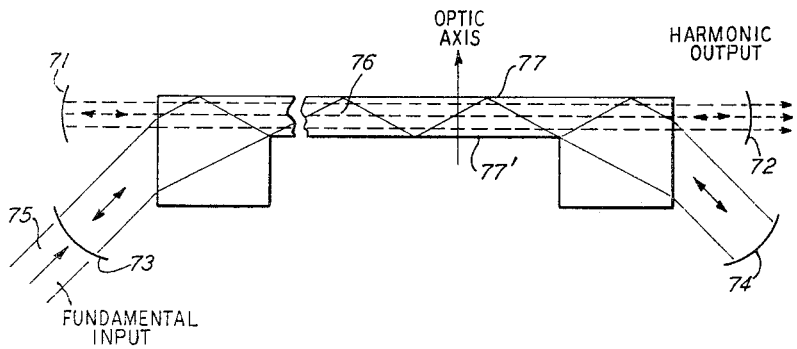

In FIG. 7, an embodiment of the invention utilizing resonant nonlinear interactions, separate resonators are provided for fundamental and harmonic beams. Such an arrangement increases the interaction within the crystal material and is particularly suitable to parametric amplifier and parametric oscillator arrangements.

For harmonic generators, the crystal of FIGS. 4 or 5B can be disposed between reflectors 71, 72 and 73, 74. An input fundamental beam 75 is incident through fundamental reflector 73 and is incident upon nonlinear harmonic generation crystal 76 in accordance with the principles hereinbefore set out. The harmonic power generated within crystal 76 travels parallel to the slab surfaces 77, 77′ and emerges normal to the crystal ends. The harmonic power is resonated between reflectors 71, 72, the latter of which is partially transmissive to permit abstraction of a portion of the harmonic power. Fundamental power is simultaneously resonated between reflectors 73, 74. When the nonlinear medium configuration of FIG. 5B is used, the alignment of the reflector pairs will be changed slightly, but the principles of operation remain the same.

In embodiments of the invention involving degenerate parametric processes, high level pump energy at the harmonic frequency is introduced into the cavity defined between reflectors 71, 72, both of which are typically opaque. Energy at one-half the pump frequency is then generated within the crystal 76 and is resonant in the cavity defined by reflectors 73, 74, one of which is typically partially transmissive. In a parametric amplification embodiment, the cavity reflectors are removed, and pump energy and signal energy at half the pump are applied to crystal 76 in place of the harmonic and fundamental rays illustrated. The principles of the invention can be extended to nondegenerate processes, in which three frequencies rather than two are involved.

In all cases the above-described arrangements are illustrative of the principles of the invention. Numerous and varied other embodiments can be devised in accordance with these principles by those skilled in the art without departing from the spirit and scope of the invention.

One interesting application involves the use of elements of nonlinear material with thicknesses comparable with a wavelength. In such thin slabs it becomes possible to excite pure lowest-order modes with techniques similar to those used in fiber optics. The dispersion is normal if the fundamental and harmonic powers are in the lowest-order guided mode. With the slab oriented normal to the optic axis there is no beam divergence; that is, $\rho=0$, and the birefringence of the medium can be used to achieve phase matching by making the fundamental an ordinary wave and the harmonic an extraordinary wave. The birefringence is made equal to the dispersion by adjusting either the slab width or the index of refraction of the surrounding medium to give exact phase velocity coincidence. The major advantage of such fiber-guided matching is that the coherence length is limited by neither refraction nor diffraction. Only absorption and available crystal length limits the interaction length. This advantage is gained at the price of difficult physical dimensions and a severe requirement of pure modes.

What is claimed is:

1. Apparatus for the generation of optical frequency wave energy which is harmonically related to the applied energy comprising a nonlinear birefringent crystal having a pair of elongated plane parallel surfaces and an optic axis normal to said surfaces, means for applying optical energy of a given fundamental frequency to said crystal, said fundamental energy being oriented with respect to said crystal to effect phase velocity matching of fundamental and harmonic beams, said fundamental frequency energy being further defined within said crystal as first and second beam portions having propagating vectors related by an angle $\varphi_m$ to said plane surfaces, $\varphi_m$ being the phase matching angle defined as $$\cos^{-1} \frac{n_2^e}{n_1^o}$$

where $n_1^o$ is the index of refraction of said crystal for the fundamental and $n_2^e$ is its refractive index for the harmonic.

2. Apparatus according to claim 1 in which said fundamental energy is applied as two separately incident beams.

3. Apparatus according to claim 1 in which said fundamental energy is applied as a single beam having first and second beam components within said crystal.

4. Apparatus according to claim 1 in which the dimension of said crystal in a direction parallel to said optic axis is of the order of a wavelength of said applied energy.

5. An optical frequency harmonic generator comprising
an element of a nonlinear birefringent crystal having an optic axis and having an elongated portion with first and second opposed parallel surfaces normal to said axis, means for introducing fundamental frequency energy into said elongated portion, the direction of power flow of said energy within said portion being normal to said axis, the direction of power flow of harmonic energy generated within said portion also being normal to said axis, said fundamental energy within said portion being incident at said surfaces at substantially an angle $\varphi_m$ for which the phase velocities of propagation in a direction parallel to said surfaces for said fundamental energy and said harmonic energy are substantially equal and for which total internal reflection occurs at said surfaces, the angle $\varphi_m$ being further defined as $$\cos^{-1} \frac{n_2^e}{n_1^o}$$

where $n_1^o$ is the index of refraction of said crystal for the fundamental and $n_2^e$ is its refractive index for the harmonic.

6. The optical harmonic generator according to claim 5 in which said means comprises first and second fundamental energy beams applied to said portion at an angle to said parallel surfaces.

7. The optical harmonic generator according to claim 5 in which said means comprises an extremity of said crystal having greater dimensions than said elongated portion in combination with a single fundamental beam applied thereto.

8. The generator according to claim 7 in which said beam is incident upon said extremity at an acute angle with respect to the surface of incidence thereof.

9. The generator according to claim 8 in which said beam is applied in a direction normal to said optic axis and is incident upon said extremity at an angle $\theta_D$ which is related to $\varphi_m$ and to the refractive index $n_1^o$ of said material at the fundamental frequency by $$\tan \theta_D = \frac{n_1^o \sin \varphi_m}{n_1^o \cos \varphi_m - 1}$$

No references cited.

ROY LAKE, *Primary Examiner.*

D. R. HOSTETTER, *Assistant Examiner.*